United States Patent [19]

Caldo et al.

[11] 4,277,371

[45] Jul. 7, 1981

[54] CATALYST-FORMING COMPONENTS, PROCESS FOR PREPARING SAME, AND CATALYSTS FOR STEREOSPECIFICALLY POLYMERIZING OLEFINS PREPARED THEREFROM

[75] Inventors: Cornelio Caldo; Luigi Basili, both of Terni, Italy

[73] Assignee: Montedison S.p.A., Milan, Italy

[21] Appl. No.: 43,038

[22] Filed: May 29, 1979

[30] Foreign Application Priority Data

May 29, 1978 [IT] Italy ............................... 23925 A/78
Nov. 13, 1978 [IT] Italy ............................... 29708 A/78

[51] Int. Cl.$^3$ ............................ C08F 4/02; C08F 4/64
[52] U.S. Cl. ............................ 252/429 B; 252/429 C; 526/129
[58] Field of Search ........................ 252/429 B, 429 C

[56] References Cited

U.S. PATENT DOCUMENTS

| | | | |
|---|---|---|---|
| 2,981,725 | 4/1961 | Luft et al. | 252/429 C X |
| 2,989,516 | 6/1961 | Schneider | 252/429 C X |
| 3,061,600 | 10/1962 | Longiave et al. | 252/429 C X |
| 3,166,542 | 1/1965 | Orzechowski et al. | 252/429 C X |
| 3,345,351 | 10/1967 | McCall et al. | 252/429 B X |
| 3,591,656 | 7/1971 | Kroll | 252/429 C X |
| 3,594,330 | 7/1971 | Delbouille et al. | 252/429 A |
| 3,769,233 | 10/1973 | Hermans et al. | 252/429 B X |
| 3,787,384 | 1/1974 | Stevens et al. | 252/429 C X |
| 3,883,492 | 5/1975 | Delbouille et al. | 252/429 C X |
| 3,953,414 | 4/1976 | Galli et al. | 252/429 B X |
| 4,098,979 | 7/1978 | Maemoto et al. | 252/429 B X |

FOREIGN PATENT DOCUMENTS

222426  5/1957  Australia.

OTHER PUBLICATIONS

*The Condensed Chemical Dictionary*, Fifth Edition (1956), Reinhold Pub. Corp., N.Y., N.Y., p. 357.

*Primary Examiner*—Patrick Garvin

[57] ABSTRACT

A solid catalyst-forming component based on titanium trichloride is prepared by reducing $TiCl_4$ to $TiCl_3$ with an organic aluminum compound, at low temperature, and in a suspension of finely dispersed siliceous material in a mixture of inert hydrocarbon solvent and $TiCl_4$. Catalysts prepared from the solid component and useful in the stereospecific polymerization of alpha-olefins to highly isotactic polymers are also disclosed.

More specifically, the disclosed process for preparing the solid catalyst-forming component comprises the following operations:

(1) preparing a suspension of finely dispersed siliceous material of the diatomite type (diatomaceous earth) in a mixture of inert hydrocarbon solvent and of $TiCl_4$;

(2) reducing $TiCl_4$ in said mixture to $TiCl_3$ with an organic aluminum compound at low temperature; and (3) washing the solid catalytic component so obtained with a hydrocarbon solvent, optionally after an activation step at 40°–150° C. in the presence of an ether as complexing agent.

11 Claims, No Drawings

CATALYST-FORMING COMPONENTS, PROCESS FOR PREPARING SAME, AND CATALYSTS FOR STEREOSPECIFICALLY POLYMERIZING OLEFINS PREPARED THEREFROM

THE PRIOR ART

Catalysts for the stereospecific polymerization of alpha-olefins to highly isotactic polymers are known. Such catalysts substantially consist of $TiCl_3$ obtained by reduction of $TiCl_4$.

The characteristics of $TiCl_3$, in the crystalline delta form, suitable for polymerizing propylene, have been described by C. W. Hock in J. Polymer Sci., 4, 3055 (1966).

U.S. Pat. No. 3,058,970 claims a process for preparing $TiCl_3$, suitable for polymerizing olefins, consisting in reducing $TiCl_4$ to $TiCl_3$ with aluminum-organic compounds, at temperatures ranging from $-20°$ C. to $+15°$ C., in activating the resulting $TiCl_3$ by means of heating to $40°-150°$ C. and optional treatment with an aluminum-organic compound. At the conclusion of the reduction, $TiCl_3$ binds $AlCl_3$ in the ratio of about 3:1 by moles.

U.S. Pat. No. 3,825,524 describes a process for preparing $TiCl_3$ useful for polymerizing olefins, consisting in reducing $TiCl_4$ to $TiCl_3$ with aluminum-organic compounds, and in activating the obtained $TiCl_3$ by means of heating, in a hydrocarbon solvent, in the presence of an organic electron-donor compound, having the function of complexing the $AlCl_3$ that has formed during the reduction, and of removing it, at least partially, in a soluble state. The complexing agents disclosed in U.S. Pat. No. 3,825,524 include ethers, thioethers, acids, phenols, ketones, aldehydes and many other organic compounds.

French Pat. No. 2,130,231 describes a process for preparing $TiCl_3$ suitable for polymerizing olefins consisting in reducing $TiCl_4$ to $TiCl_3$ with metals or aluminum-organic compounds, in preactivating, by heating, the $TiCl_3$ obtained (in the beta crystalline form), in activating the catalyst by means of hot complexing, in a hydrocarbon solvent, with an organic electron-donor compound, adding also $TiCl_4$, which has the function of stabilizing the catalyst morphology.

The complexing agents disclosed in the French patent are organic compounds belonging to the classes of the ethers, thioethers, mercaptans, primary, secondary and tertiary amines, and other organic compounds.

In case the complexing agents are ethers, they are of the same type as those included in U.S. Pat. No. 3,825,524.

British Pat. No. 1,282,897 and Japanese Pat. Nos. 72-06409, 73-17886 and 76-32493 disclose that, in addition to $TiCl_4$, the morphology of the catalysts of U.S. Pat. No. 3,825,524 can be stabilized by $SiCl_4$ or $CCl_4$. Luxembourg Pat. No. 80, 449 discloses that $TiBr_4$ can be utilized to stabilize the morphology of catalysts one component of which is $TiCl_3$ obtained by reduction of $TiCl_4$.

THE PRESENT INVENTION

One object of this invention is to provide an improved process for preparing catalyst-forming components based on $TiCl_3$ obtained by reduction of $TiCl_4$ and which yield final catalysts effective for the stereospecific polymerization of alpha-olefins to good yields of highly isotactic polymers, that is to polymers with a high content of macromolecules having substantially the isotactic structure and characterized in being insoluble in, or non-extractable with, boiling n-heptane.

That an other objects are achieved in accordance with the process of this invention which comprises the following operations:

(1) preparing a suspension of finely dispersed siliceous material of the diatomite type (diatomaceous earth) in a mixture of an inert hydrocarbon solvent and of $TiCl_4$, the diatomite amount being equal to 2-100 g per mole of $TiCl_4$;

(2) reducing $TiCl_4$ in said mixture to $TiCl_3$ with aluminum-organic compounds, in particular with aluminum triethylsesquichloride, at low temperature, preferably ranging from $-20°$ C. to $+20°$ C. to obtain a catalytic compound which corresponds to general formula $TiCl_3 \cdot \frac{1}{3} AlCl_3$, physically bound to diatomite;

(3) washing said solid catalytic component with a hydrocarbon solvent, and filtering and drying the same.

To improve the performance of the catalyst component in the polymerization of the olefins, it is preferably subjected to a heat treatment at $40°-150°$ C. for a time ranging from 10 minutes to 5 hours, preferably from 30 to 60 minutes.

A presently preferred embodiment of our invention comprises the further step:

(4) carrying out an activation step, at $40°-150°$ C., in the presence of a complexing agent consisting of an aliphatic or aromatic ether, and removing, by means of washings with hydrocarbon solvents, the $AlCl_3$ that has been transformed into a soluble form by complexing.

The diatomite utilized in the practice of this invention is a natural product consisting of a type of silica of organic origin, of micro-organisms of the diatom type. Such product is known under various commercial names such as fossil meal, kiegeselguhr, etc.

It has a high silica content, generally exceeding 80% by weight, and includes, as most usual components: alumina, iron oxide, titanium oxide, calcium oxide, magnesium oxide and alkali.

Likewise useful are diatomites with a silica content below 80%, such as those having a silica content ranging from 50% to 80% by weight.

The above-mentioned siliceous materials are characterized by an apparent density of the order of 0.2 g/cc and by a microporous structure of the granules which exhibit a formation typical of the spongy or dendrite type.

The products known under the commercial name of "Celite" (trademark of Johns-Manville Corp.) have proved particularly suitable.

In the following examples a "Celite" of the type "Superfine Superfloss", having the following composition in percent by weight.

| | |
|---|---|
| silica | 91.9 |
| alumina | 3.3 |
| iron oxide | 1.3 |
| titanium oxide | 0.3 |
| calcium oxide | 0.5 |
| magnesium oxide | 0.5 |
| alkali | 2.0 | and an apparent density of about 0.2 g/cc has been used in an amount of 2-100 g per gram mole of $TiCl_4$.

The catalyst components containing diatomite, prepared according to the present invention, not subjected to ether treatment, have the following molar composition: $TiCl_3.\frac{1}{3}$ $AlCl_3$ fixed on diatomite in an amount equal to 2-100 g/mole of $TiCl_3$.

The porosity of such components is $>0.05$ cc/g and the surface area ranges from 20 to 100 $m^2/g$.

The X-ray diffraction spectrum exhibits the characteristic lines of the beta form of $TiCl_3$ for the product obtained from the reduction and of the delta form for the product successively subjected to heat treatment, and a very intense line, at 4.13 Å, typical of diatomite.

The presently preferred catalyst components according to our invention are those obtained through the optional activation step 4.

Ethers suitable as complexing agent for $AlCl_3$ in this step 4, are in particular the aliphatic ethers R—O—R'. Those wherein R and R', the same or different, are methyl, ethyl, n-propyl, isopropyl, n-butyl, t-butyl, n-amyl, isoanyl and the like, have proved to be particularly suitable as ethers to be utilized as complexing agents of $AlCl_3$, according to this invention.

The ether amount to be employed for 100 g of raw catalyst (consisting of the reduction product of $TiCl_4$ supported on diatomite) ranges from 20 to 200 g. Generally the ether is mixed with a hydrocarbon solvent, in particular hexane, heptane, octane, toluene, xylene and the like. It is employed either at atmospheric pressure or under increased pressure.

The catalyst components subjected to ether treatment according to the present invention have the following molar composition: $TiCl_3.(AlCl_3)_{0.005-0.2}.(ether)_{0.01-0.3}$ and are supported on diatomite in an amount equal to 2-100 g/mole of $TiCl_3$.

The porosity of such catalysts is higher than 0.10 cc/g and the surface area ranges from 50 to 150 $m^2/g$.

In the X-ray diffraction spectrum it is possible to observe the typical lines of the delta form of $TiCl_3$ and a very intense line, at 4.13 Å, characteristic of the support diatomite.

The catalytic components prepared according to this invention are utilized in the stereospecific polymerization and copolymerization of the olefins, along with cocatalysts preferably consisting of aluminum-organic compounds, such as aluminum triethyl, aluminum triisobutyl, aluminum diethylmonochloride and the like, optionally complexed with organic esters.

The polymers, which are obtained with high yields, possess a high isotacticity index, a good apparent density, a narrow granulometric distribution, particularly in the range of average diameters of the flakes comprised between 150 and 850 microns, and furthermore they easily absorb liquid additives due to their high porosity.

This permits to obtain free-flowing powders containing relatively high amounts of liquid additives.

Such polymers, furthermore, are suitable for being used in the extrusion coating of plastic films.

It was ascertained, moreover, that the catalysts prepared according to this invention permit, in comparison with the catalysts for flakes obtained by reducing $TiCl_4$ with Al alkyls and non-supported, an easier purification of the polymer from the catalytic residues also in the processes which utilize low-boiling alcohols (methanol) for the purification.

Wide modifications and changes may be brought to this invention when practicing it, without departing from its spirit and its objects.

The following examples are given to illustrate this invention in more detail and are not intended to be limiting.

EXAMPLE 1

1,250 cc of dearomatized n-heptane, 490.2 g of titanium tetrachloride, and 55 g of diatomite "Celite" were introduced into a stainless steel 5 liter autoclave, in a nitrogen atmosphere and stirred for two hours at room temperature.

The mass was cooled down to 8°-10° C. 372.9 g of aluminium triethyl sesquichloride (reducing agent) were added, the temperature being maintained at 8°-10° C. for 120 minutes. The resulting product was filtered, washed with n-heptane and dried. It exhibited the following characteristics:

Composition resulting from the analysis: $TiCl_3.\frac{1}{3}$ $AlCl_3.(diatomite)_{65\ g}$; surface area: 21.1 $m^2/g$; porosity: 0.062 $cm^3/g$; shape of the pores: cylindrical (micropores).

On the X-ray analysis, the prevailing crystalline form was found to be the beta form.

Polymerization Test 1

50 l of dearomatized n-heptane,
18 g of the catalyst component prepared as described in Example 1, and
860 g of aluminum diethylmonochloride in a 10% heptane solution were introduced into a stainless steel 200 liter autoclave.

After heating to 70° C., propylene was introduced for 3 hours till reaching an amount of 60 l. of liquid propylene. The unreacted propylene was then degassed.

The mass was cooled down, the catalytic complex was decomposed by addition of 2 liters of n-butyl alcohol, and it was heated to 100° C. for 1 hour. After cooling, the resulting slurry was transferred to a 400 liter reactor, 50 l of water and 2 g of surfactant were added, after which the product was stripped in a vapor stream to remove the solvent. The suspension remaining after the distillation was centrifuged and then dried at 60° C.

18.9 kg of a polymer having the following characteristics were obtained:

| | | |
|---|---|---|
| residue of the extraction with heptane | | 72.5% |
| apparent density | | 0.26 g/cc |
| granulometry: | >840 microns | 34% |
| | from 420 to 840 microns | 38% |
| | from 250 to 420 microns | 20% |
| | from 177 to 250 microns | 6% |
| | from 149 to 177 microns | 1% |
| | from 74 to 149 microns | 1% |
| | <74 microns | 0% |

Polymerization Test 2

50 l of dearomatized n-heptane,
11 g of the catalyst component of Example 1, and
860 g of aluminum diethylmonochloride in a 10% heptane solution were introduced into a stainless steel 200 l autoclave.

After heating to 70° C., propylene was introduced for 3 hours up to an amount of 60 l, whereupon the unreacted propylene was degassed. After cooling, the catalytic complex was decomposed by addition of 2 l of n-butyl alcohol.

The mass was heated to 100° C. for 1 hour. It was cooled down, the slurry was transferred to a 400 l reactor, 50 l of water and 2 g of surfactant were added and the solvent was removed by distillation in a vapor stream. The resulting suspension was centrifuged and then dried at 60° C.

18.7 kg of a polymer having the following characteristics were obtained:

| residue of the extraction with heptane | | | 72.9% |
|---|---|---|---|
| apparent density | | | 0.28 g/cc |
| granulometry: | >840 | microns | 9.0% |
| | from 420 to 840 | microns | 75.0% |
| | from 250 to 420 | microns | 15.0% |
| | from 177 to 250 | microns | 1.0% |
| | from 149 to 177 | microns | 0% |
| | from 74 to 149 | microns | 0% |
| | <74 | microns | 0%. |

Polymerization Test 3

50 liters of dearomatized n-heptane,
16 grams of a reduced and non-supported catalyst, prepared according to U.S. Pat. No. 3,058,970, and
860 grams of aluminum diethylmonochloride in a 10% heptane solution were introduced into a stainless steel 200 liter autoclave.

After heating to 70° C., propylene was introduced in 3 hours up to an amount of 60 l. The unreacted propylene was then degassed, the mass was cooled down and the catalytic complex was decomposed by addition of 2 liters of n-butyl alcohol. The mass was heated to 100° C. for 1 hour. After cooling, the slurry was transferred to a 400 liter reactor, 50 l of water and 2 g of surfactant were added, and the solvent was removed by distillation in a vapor stream. The resulting suspension was centrifuged and then dried at 60° C.

14.2 Kg of polymer were obtained.

EXAMPLE 2

1,250 cc of dearomatised n-heptane, 490.2 g of titanium tetrachloride, and 55 g of diatomite "Celite" were introduced into a stainless steel 5 liter autoclave, in a nitrogen atmosphere. The mass was stirred for 2 hours at room temperature, and then cooled down to 8°–10° C. 372.9 g of aluminum triethylsesquichloride were added, maintaining a temperature of 8°–10° C. for 120 minutes.

The resulting supported complex $(TiCl_3)_3 \cdot AlCl_3$ was preactivated by heating to 120° C. for 30 minutes. The product so obtained was filtered, washed with n-heptane and dried. It exhibited the following characteristics:

Composition resulting on analysis: $TiCl_3 \cdot \frac{1}{3} AlCl_3 \cdot$ (diatomite)$_{65 g}$, surface area: 96.1 m$^2$/g, porosity: 0.120 cc/g, shape of the pores: slit-like.

The prevailing crystalline form was the delta form, as determined by X-rays analysis.

Polymerization Test 1

50 liters of dearomatized n-heptane;
19.5 grams of the catalyst component of Example 2; and
860 grams of aluminum diethylmonochloride in a 10% heptane solution were introduced into a stainless steel 200 liter autoclave.

After heating to 70° C., propylene in an amount of 60 l was introduced in 3 hours. The unreacted propylene was then degassed. After cooling, the catalytic complex was decomposed by the addition of 2 liters of n-butyl alcohol.

The mass was heated to 100° C. for 1 hour and after cooling, the slurry was transferred to a 400 liter reactor. 50 liters of water and 2 grams of surfactant were added; finally it was distilled in a vapor stream to remove the solvent. The resulting suspension was centrifuged and then dried at 60° C.

30.21 kg of a polymer having the following characteristics were obtained:

| residue of the extraction with heptane | | | 84.7% |
|---|---|---|---|
| apparent density | | | 0.33 g/cc |
| granulometry: | >840 | microns | 2.5% |
| | from 420 to 840 | microns | 3.5% |
| | from 250 to 420 | microns | 50.% |
| | from 177 to 250 | microns | 20.% |
| | from 149 to 177 | microns | 3.% |
| | from 74 to 149 | microns | 8.% |
| | <74 | microns | 3.5%. |

Polymerization Test 2

50 liters of dearomatized n-heptane,
9 grams of the catalyst component of Example 2, and
860 grams of aluminum diethylmonochloride in a 10% heptane solution were introduced into a stainless steel 200 l autoclave.

After heating to 70° C., 60 l of propylene were introduced in 3 hours. The unreacted propylene was then degassed, the remaining mass was cooled and 2 liters of n-butyl alcohol were added to it to decompose the catalyst. The mass was heated to 100° C. for 1 hour, then it was cooled, the slurry was transferred into a 400 liter reactor, 50 l of water and 2 g of surfactant were added, finally it was distilled in a vapor stream to remove the solvent. The residual suspension was centrifuged and then dried at 60° C. 22.23 kg of a polymer having the following characteristics were obtained:

| residue of the extraction with heptane | | | 82.% |
|---|---|---|---|
| apparent density | | | 0.28 g/cc |
| granulometry: | >840 | microns | 1.0% |
| | from 420 to 840 | microns | 0.4% |
| | from 250 to 420 | microns | 50.0% |
| | from 177 to 250 | microns | 34.0% |
| | from 149 to 177 | microns | 7.0% |
| | from 74 to 149 | microns | 6.0% |
| | <74 | microns | 1.6%. |

Polymerization Test 3

50 liters of dearomatized n-heptane,
17.5 grams of a reduced and non-supported catalyst, preactivated by a two-hour heating to 135° C., according to U.S. Pat. No. 3,058,970, and
860 grams of aluminum diethylmonochloride in a 10% heptane solution were introduced into a stainless steel 200 liter autoclave.

It was heated to 70° C. and 60 liters of propylene were introduced in 3 hours. The unreacted propylene was then degassed.

After cooling, the catalytic complex was decomposed by addition of 2 liters of n-butyl alcohol. It was heated to 100° C. for 1 hour. After cooling, the slurry was transferred into a 400 liter reactor, 50 liters of water and 2 grams of surfactant were added, finally it was distilled in a vapor stream to remove the solvent. The suspension was centrifuged and then dried at 60° C. 22.6 kg of a polymer having the following characteristics were obtained:

| residue of the extraction with heptane | | | 84.0% |
|---|---|---|---|
| apparent density | | | 0.49 g/cc |
| granulometry: | | >840 microns | 0.38% |
| | from 420 to 840 | microns | 10.5% |
| | from 250 to 420 | microns | 53.2% |
| | from 177 to 250 | microns | 29.2% |
| | from 149 to 177 | microns | 3.7% |
| | from 74 to 149 | microns | 2.9% |
| | | <74 microns | 0.2%. |

EXAMPLE 3

1,250 cc of dearomatized n-heptane, 438.6 g of titanium tetrachloride, and 110 g of diatomite "Celite" were introduced into a stainless steel 5 liter autoclave, in a nitrogen atmosphere. It was stirred 2 hours at room temperature, then cooled to 8°–10° C. Successively, 435.1 g of aluminum triethylsesquichloride were added, keeping a temperature of 8°–10° C. for 120 minutes. The resulting product was filtered, washed with n-heptane and dried. It exhibited the following characteristics:

Composition revealed on analysis: $TiCl_3.\frac{1}{3} AlCl_3$.(diatomite) $_{143\,g.}$ surface area: 67.5 m$^2$/g, porosity: 0.092 cc, shape of the pores: cylindrical (micropores).

On X-ray analysis, the prevailing crystalline form was the beta form.

Polymerization test 50 liters of dearomatized n-heptane,
14.7 grams of the catalyst component as obtained above; and
860 grams of aluminum diethylmonochloride in a 10% heptane solution were introduced into a stainless steel 200 liter autoclave.

After heating to 70° C., 60 liters of propylene were introduced in 3 hours. The unreacted propylene was then degassed. It was cooled down and the catalytic complex was decomposed by addition of 2 liters of n-butyl alcohol.

It was heated to 100° C. for 1 hour. After cooling, the slurry was transferred to a 400 liter reactor, 50 liters of water and 2 grams of surfactant were added, whereupon it was distilled in a vapor stream to remove the solvent.

The suspension was centrifuged and then dried at 60° C. 17.7 kg of a polymer having the following characteristics were obtained:

| residue of the extraction with heptane: | | | 69.% |
|---|---|---|---|
| apparent density: | | | 0.28 g/cc |
| granulometry: | | >840 microns | 2.0% |
| | from 420 to 840 | microns | 45.0% |
| | from 250 to 420 | microns | 44.7% |
| | from 177 to 250 | microns | 4.0% |
| | from 149 to 177 | microns | 2.8% |
| | from 74 to 149 | microns | 1.5% |
| | | <74 microns | 0.% |

EXAMPLE 4

1,250 cc of dearomatized n-heptane, 464.4 g of titanium tetrachloride, and 82.5 g of diatomite "Celite" were introduced into a stainless steel 5 liter autoclave. The mass was stirred for two hours, at room temperature, and then cooled to 8°–10° C. 353.0 g of aluminum triethylsesquichloride were added, keeping the temperature of 8°–10° C. for 120 minutes. The resulting product was filtered, washed with n-heptane and dried. It exhibited the following characteristics:

Composition on analysis: $TiCl_3.\frac{1}{3} AlCl_3$.(diatomite) $_{101\,g.}$ surface area: 81.8 m$^2$/g, porosity: 0.127 cc/g shape of pores: cylindrical (micropores).

On X-ray analysis, the prevailing crystalline form was found to be the beta form.

Polymerization Test 50 liters of dearomatized n-heptane,
16.5 grams of the catalytic component prepared above, and
860 grams of aluminum diethylmonochloride in a 10% heptane solution were introduced into a stainless steel 200 liter autoclave.

It was heated to 70° C. and 60 liters of propylene were introduced in 3 hours. The unreacted propylene was then degassed. After cooling down, the catalytic complex was decomposed by addition of 2 liters of n-butyl alcohol.

It was heated to 100° C. for 1 hour. After cooling, the slurry was transferred into a 400 liter reactor, 50 liters of water and 2 grams of surfactant were then added, finally it was distilled in a vapor stream to remove the solvent. The suspension remaining after the distillation was centrifuged and then dried at 60° C. 19.5 kg of a polymer having the following characteristics were obtained:

| residue of the extraction with heptane | | | 66.% |
|---|---|---|---|
| apparent density | | | 0.29 g/cc |
| granulometry: | | >840 microns | 1.5% |
| | from 420 to 840 | microns | 12.0% |
| | from 250 to 420 | microns | 68.0% |
| | from 177 to 250 | microns | 5.0% |
| | from 149 to 177 | microns | 11.2% |
| | from 74 to 149 | microns | 2.3% |
| | | <74 microns | 0%. |

EXAMPLE 5

1,250 cc of dearomatized n-heptane, 524,5 g of titanium tetrachloride, and 27.5 g of diatomite "Celite" were introduced, in a nitrogen atmosphere, into a stainless steel 5 liter autoclave. Stirring was conducted for 2 hours, at room temperature. It was cooled down to 8°–10° C. Successively 397.8 g of aluminum triethylsesquichloride were added thereto, keeping a temperature of 8°–10° C. for 120 minutes. The resulting supported complex $TiCl_3.\frac{1}{3} AlCl_3$ was preactivated by heating to 120° C. for 30 minutes.

The n-heptane was removed by decantation, whereupon the complex was diluted with 1,250 cc of dearomatized n-heptane. 358.4 g of n-butyl ether (complexing agent) were added, and the mass was heated to 120° C. for 30 minutes, to complete the activation of the catalyst.

The product obtained was filtered, washed with n-heptane and dried. It exhibited the following characteristics:

Composition revealed on analysis: TiCl$_3$.(AlCl$_3$)$_{0.13}$.(n-butyl ether)$_{0.11}$.(diatomite)$_{10.8}$ $_g$. surface area 78.3 m$^2$/g, porosity 0.17 cc/g.

Polymerization Test 50 l of dearomatized n-heptane,
17.6 g of the catalyst component of Example 5, and
860 g of aluminum diethylmonochloride in a 10% heptane solution were introduced into a stainless steel 200 liter autoclave.

It was heated to 70° C. and 50 l of propylene were introduced during 3 hours, whereupon the unreacted propylene was vented to the atmosphere. The mass was cooled down and the catalytic complex was decomposed by addition of 2 l of n-butyl alcohol. It was heated 1 hour to 100° C. After cooling, the slurry was transferred to a 400 l reactor, 50 l of water and 2 g of surfactant were added thereto, finally it was distilled in a vapor stream to remove the solvent. The susepnsion was centrifuged and dried at 60° C. 28 kg of polymer having the following characteristics were obtained:

| residue of the extraction with heptane: | | 94.4% |
|---|---|---|
| apparent density*: | | 0.44 g/cc |
| granulometric analysis: | above 840 μ | 0.5% |
| | from 420 to 840 μ | 24.8% |
| | from 250 to 420 μ | 55.6% |
| | from 177 to 250 μ | 16.1% |
| | from 149 to 177 μ | 0.3% |
| | from 74 to 149 μ | 2.7% |
| | below 74 μ | 0.0% |

EXAMPLE 6

1,250 cc of dearomatized n-heptane, 490.2 g of titanium tetrachloride, and 55 g of diatomite "Celite" were introduced into a stainless steel 5 liter autoclave, in a nitrogen atmosphere. It was stirred 2 hours at room temperature, and then cooled to 8°–10° C. 372.9 g of aluminum triethylsesquichloride were added, maintaining the temperature at 8°–10° C. for 120 minutes.

The n-heptane was removed by decantation and the complex was diluted with 1,250 cc of dearomatized n-heptane. 334.9 g of n-butyl ether were added thereto and the whole was heated to 120° C. for 30 minutes, in order to complete the activation of the catalyst. The product obtained was filtered, washed with n-heptane and dried.

It exhibited the following characteristics:
Composition revealed on analysis: TiCl$_3$.(AlCl$_3$)$_{0.15}$.(n-butyl ether)$_{0.10}$.(diatomite)$_{21.3}$ $_g$. porosity 0.1120 cc surface area 92.6 m$^2$/g.

Polymerization Test 50 l of dearomatized n-heptane,
19.7 g of the catalyst component of Example 6, and
860 g of aluminum diethylmonochloride in a 10% heptane solution were introduced into a stainless steel 200 liter autoclave.

The mass was heated to 70° C. and 50 l of propylene were introduced during 3 hours. Unreacted propylene was then vented to the atmosphere. It was cooled and the catalytic complex was decomposed by addition of 2 l of n-butyl alcohol. The whole was heated to 100° C. for 1 hour. After cooling, the slurry was transferred to a 400 liter reactor, 50 l of water and 2 g of surfactant were added, finally it was stripped in a vapor stream to remove the solvent, and the resulting suspension was centrifuged and dried at 60° C. 27.2 kg of a polymer having the following characteristics were so obtained:

| residue of the extraction with heptane: | | 94.7% |
|---|---|---|
| apparent density: | | 0.46 g/cc |
| granulometric analysis: | | |
| | above 840 μ | 4.5% |
| | from 420 to 840 μ | 6.8% |
| | from 250 to 420 μ | 50.4% |
| | from 177 to 250 μ | 20.0% |
| | from 149 to 177 μ | 8.3% |
| | from 74 to 149 μ | 7.5% |
| | below 74 μ | 2.5% |

EXAMPLE 7

1,250 cc of dearomatized n-heptane, 438.6 g of titanium tetrachloride, and 100 g of diatomite "Celite" were introduced into a stainless steel 5 liter autoclave, in a nitrogen atmosphere. The mass was stirred for 2 hours at room temperature, and then cooled to 8°–10° C. 325.1 g of aluminum triethylsesquichloride were added, maintaining the temperature at 8°–10° C. for 120 minutes.

The resulting supported complex TiCl$_3$.⅓ AlCl$_3$ was preactivated by heating to 120° C. for 30 minutes. The n-heptane was removed by decantation, and the complex was diluted with 1,250 cc of dearomatized n-heptane. 299.7 g of n-butyl ether were added and the whole was heated to 120° C. for 30 minutes, in order to complete the activation of the catalyst component.

The product obtained was filtered, washed with n-heptane and dried. It exhibited the following characteristics:

Composition revealed on analysis: TiCl$_3$.(AlCl$_3$)$_{0.13}$.(n-butyl ether)$_{0.12}$.(diatomite)$_{47.6}$ $_g$ surface area: 73 m$^2$/g, porosity: 0.158 cc/g.

The X-ray diffraction spectrum is recorded in the following Table.

| X-RAY DIFFRACTION SPRECTRUM | | | | | | | |
|---|---|---|---|---|---|---|---|
| Lines corresponding to lattice planes (A) | 6.10 | 5.35 | 5.15 | 4.13 | 2.75 | 1.77 | 1.69 |
| Intensity (integrated) of the lines | f | mf | m | f | f | mf | d |
| Intensity (maximum) of the lines | f | m | md | ff | f | f | d |
| Width of the lines (2 θ) | 0.80 | 0.40 | 1.40 | 1.20 | 3.50 | 1.10 | 1.00 | ff — very strong
f — strong
mf — medium strong
m — medium
md — medium weak
d — weak Polymerization Test 50 l of dearomatized n-heptane;
15.2 g of the catalyst component of Example 7, and
860 g of aluminum diethylmonochloride in a 10% heptane solution were introduced into a stainless steel 200 liter autoclave.

After heating to 70° C., 50 liters of propylene were introduced in 3 hours. The unreacted propylene was then vented to the atmosphere, The mass was cooled, and the catalytic complex was decomposed by addition of 2 liters of n-butyl alcohol. It was heated to 100° C. for 1 hour, the slurry was transferred to a 400 liter reactor, 50 l of water and 2 g of surfactant were added, whereupon it was distilled in a vapor stream to remove the solvent.

The suspension was centrifuged and dried at 60° C. 27.5 kg of a polymer having the following characteristics were obtained:

| residue of the extraction with heptane: | | 94.9% |
|---|---|---|
| apparent density: | | 0.48 g/cc |
| granulometric analysis: | above 840 μ | 4.4% |
| | from 420 to 840 μ | 23.0% |
| | from 250 to 420 μ | 55.4% |
| | from 177 to 250 μ | 8.5% |
| | from 149 to 177 μ | 3.2% |
| | from 74 to 149 μ | 5.5% |
| | below 74 μ | 0.0%. |

EXAMPLE 8

1,250 cc of dearomatized n-heptane, 438.6 g of titanium tetrachloride, and 110 g of diatomite "Celite" were introduced into a stainless steel 5 liter autocalve, in a nitrogen atmosphere and stirred for 2 hours at room temperature.

It was cooled down to 8°–10° C. 325.1 l of aluminum triethylsesquichloride were then added, keeping the temperature at 8°–10° C. for 120 minutes. The resulting supported complex $TiCl_3.\frac{1}{3} AlCl_3$ was preactivated by heating to 90° C. for 60 minutes. The n-heptane was removed by decantation and the complex was diluted with 1,250 cc of dearomatized n-heptane.

After addition of 299.7 g of n-butyl ether, the whole was heated to 90° C. for 60 minutes in order to complete the activation of the catalyst. The product obtained was filtered, washed with n-heptane and dried. It exhibited the following characteristics:

Composition revealed on analysis: $TiCl_3.(AlCl_3)_{0.125}.(\text{n-butyl ether})_{0.13}.(\text{diatomite})_{47.2\ g}$.

Polymerization Test 50 l of dearomatized n-heptane,
16.5 g of the catalyst component of Example 8, and
860 g of aluminum diethylmonochloride in a 10% heptane solution were introduced into a stainless steel 200 liter autoclave, and heated to 70° C. 50 l of propylene were introduced in 3 hours, and the unreacted propylene was then vented to the atmosphere. The mass was cooled and the catalytic complex was decomposed by adding 2 l of n-butyl alcohol. The whole was heated to 100° C. for 1 hour, whereupon it was cooled, the slurry was transferred to a 400 liter reactor, 50 l of water and 2 g of surfactant were added, and finally it was distilled in a vapor stream to remove the solvent. The suspension was centrifuged and dried at 60° C. 28.2 kg of a polymer having the following characteristics were obtained:

| residue of the extraction with heptane: | | 94.5% |
|---|---|---|
| apparent density: | | 0.47 g/cc |
| granulometric analysis: | above 840 μ | 0.8% |
| | from 420 to 840 μ | 1.7% |
| | from 250 to 420 μ | 25.5% |
| | from 177 to 250 μ | 50.1% |
| | from 149 to 177 μ | 12.0% |
| | from 74 to 149 μ | 4.7% |
| | below 74 μ | 5.2%. |

EXAMPLE 9

1,250 cc of dearomatized n-heptane, 438.6 g of titanium tetrachloride and 110 g of diatomite "Celite" were introduced into a stainless steel 5 liter autoclave, in a nitrogen atmosphere, and stirred 2 hours at room temperature. The mass was cooled to 8°–10° C. and 325.1 g of aluminum triethylsesquichloride were then added, maintaining the temperature at 8°–10° C. for 120 minutes.

The resulting supported complex $TiCl_3.\frac{1}{3} AlCl_3$ was preactivated by heating to 130° C. for 15 minutes. The n-heptane was removed by decantation and the complex was diluted with 1,250 cc of dearomatized n-heptane.

299.7 g of n-butyl ether were added, and the whole was heated to 130° C. for 15 minutes in order to complete the activation of the catalyst. The product obtained was filtered, washed with n-heptane and dried. It exhibited the following characteristics:

Composition revealed on analysis: $TiCl_3.(AlCl_3)_{0.11}.(\text{n-butyl ether})_{0.10}.(\text{diatomite})_{47.5\ g}$.

Polymerization test 50 l of dearomatized n-heptane,
15.5 g of the component as prepared in Example 9, and
860 g of aluminum diethylmonochloride in a 10% heptane solution were introduced into a stainless steel 200 liter autoclave, and heated to 70° C. 50 l of propylene were introduced in 3 hours. The unreacted propylene was then vented to the atmosphere. The mass was cooled and the catalytic complex was decomposed by adding 2 l of n-butyl alcohol. The whole was heated to 100° C. for 1 hour, cooled, the slurry was transferred to a 100 liter reactor, and 50 l of water and 2 g of surfactant were added; finally it was distilled in a vapor stream in order to remove the solvent.

The suspension was centrifuged and dried at 60° C. 27.9 kg of a polymer having the following characteristics were obtained:

| residue of the extraction with heptane: | | 95.1% |
|---|---|---|
| apparent density: | | 0.45 g/cc |
| granulometric analysis: | above 840 μ | 1.8% |
| | from 420 to 840 μ | 4.0% |
| | from 250 to 420 μ | 83.4% |
| | from 177 to 250 μ | 8.0% |
| | from 149 to 177 μ | 0.4% |
| | from 74 to 149 μ | 2.0% |
| | below 74 μ | 0.4%. |

EXAMPLE 10

1,250 cc of dearomatized n-heptane, 438.6 g of titanium tetrachloride, and 110 g of diatomite "Celite" were introduced into a stainless steel 5 liter autoclave, in a nitrogen atmosphere. It was cooled to 8°–10° C., whereupon 325.1 g of aluminum triethylsesquichloride were added, maintaining the temperature at 8°–10° C. for 120 minutes.

The resulting supported complex $TiCl_3.\frac{1}{3} AlCl_3$ was preactivated by heating to 120° C. for 30 minutes. The n-heptane was removed by decantation and the complex was diluted with 1,250 cc of dearomatized n-heptane. After addition of 350 g of n-butyl ether, the whole was heated to 120° C. for 30 minutes in order to complete the activation of the catalyst. The product obtained was filtered, washed with n-heptane and dried. It exhibited the following characteristics:

Composition revealed on analysis: $TiCl_3.(AlCl_3)_{0.09}.(\text{n-butyl ether})_{0.12}.(\text{diatomite})_{47.1\ g}$ Polymerization Test 50 l of dearomatized n-heptane,
18.2 g of the catalyst and component of Example 10, and
860 g of aluminum diethylmonochloride in a 10% heptane solution
were introduced into a stainless steel 200 liter autoclave, and heated to 70° C. 50 l of propylene were introduced in 3 hours. The unreacted propylene was then vented to the atmosphere. It was cooled down and the catalytic complex was decomposed by adding 2 l of n-butyl alcohol. After heating to 100° C. for 1 hour, and then cooling the slurry, it was transferred to a 400 liter reactor, 50 l of water and 2 g of surfactant were added, and finally it was distilled in a vapor stream to remove the solvent. The suspension was centrifuged and dried at 60° C. 26.9 kg of a polymer having the following characteristics were obtained:

| residue of the extraction with heptane | | 94.3% |
|---|---|---|
| apparent density | | 0.46 g/cc |
| granulometric analysis: | above 840 μ | 0.5% |
| | from 420 to 840 μ | 24.8% |
| | from 250 to 420 μ | 55.6% |
| | from 177 to 250 μ | 16.1% |
| | from 149 to 177 μ | 0.3% |
| | from 74 to 149 μ | 2.7% |
| | below 74 μ | 0.0% |

EXAMPLE 11

50 l of dearomatized n-heptane, 16.1 g of the component prepared according to Example 7, and 141.3 g of aluminum triisobutyl in a 45% heptane solution and complexed with 53.5 g of methyl p-methyl-benzoate were introduced into a stainless steel 200 liter autoclave and heated to 70° C. 50 l of propylene were introduced in 3 hours. The unreacted propylene was then vented to the atmosphere. The mass was cooled and the catalytic complex was decomposed by adding 2 l of n-butyl alcohol. The whole was heated to 100° C. for 1 hour, then cooled, the slurry was transferred to a 400 liter reactor, 50 l of water and 2 g of surfactant were added; finally, it was distilled in a vapor stream in order to remove the solvent.

The suspension was centrifuged and dried at 60° C. 29.5 kg of a polymer having the following characteristics were obtained:

| residue of the extraction with heptane | | 94.8% |
|---|---|---|
| apparent density | | 0.44 g/cc |
| granulometric analysis: | above 840 μ | 2.2% |
| | from 420 to 840 μ | 9.6% |
| | from 250 to 420 μ | 48.4% |
| | from 177 to 250 μ | 21.0% |
| | from 149 to 177 μ | 6.2% |
| | from 74 to 149 μ | 4.9% |
| | below 74 μ | 7.7% |

EXAMPLE 12

1,250 cc of dearomatized n-heptane, 490.2 g of titanium tetrachloride, and 55 g of diatomite "Celite" were introduced into a stainless steel 5 liter autoclave, in a nitrogen atmosphere. The mass was stirred for 2 hours at room temperature.

It was cooled to 8°–10° C., 342 g of aluminum triethylsesquichloride (reducing agent) were added, maintaining the temperature at 8°–10° C. for 120 minutes, and then it was heated to 120° C. for 30 minutes. The resulting product was filtered, washed with n-heptane and dried. It exhibited the following characteristics:

Composition revealed on analysis: $TiCl_3(AlCl_3)_{0.33}.(\text{diatomite})_{25.1\ g}$. surface area (m$^2$/g): 96.5 porosity (cc/g): 0.1200. The X-ray diffraction spectrum, obtained by means of a Debye camera having a 114.6 mm diameter, using the Ni-filtered radiation $C_4K\alpha$, with a 36 kV voltage and an 18 mA current, with an exposure of 15 hours, revealed the presence of crystalline $SiO_2$ and of the crystalline delta form of $TiCl_3$.

Polymerization Test 50 liters of dearomatized n-heptane,
30 grams of the catalyst component obtained above, and
860 grams of aluminum diethylmonochloride in a 10% heptane solution were introduced into a stainless steel 200 liter autoclave.

The mass was heated to 70° C. and 60 l of propylene were introduced in 3 hours. Thereafter the mass was degassed to remove unreacted propylene.

After cooling, the catalytic complex was decomposed by addition of 2 liters of n-butyl alcohol, and the whole was heated to 100° C. for 1 hour. After cooling, the slurry was transferred into a 400 liter reactor, 50 liters of water and 2 grams of surfactant were added, and finally it was distilled in a vapor stream to remove the solvent. The suspension was centrifuged and then dried at 60° C. 25.2 kg of a polymer having the following characteristics were obtained:

| residue of the extraction with heptane: | | 82.% |
|---|---|---|
| apparent density: | | 0.28 g/cc |
| granulometry: | >840 microns | 1.% |
| | from 420 to 840 microns | 0.4% |
| | from 250 to 420 microns | 50.% |
| | from 177 to 250 microns | 34.% |
| | from 149 to 177 microns | 7.% |
| | from 74 to 149 microns | 6.% |
| | <24 microns | 1.6% |

COMPARATIVE EXAMPLE 13

1,250 cc of dearomatized n-heptane, 490.2 g of titanium tetrachloride, and 285 g of diatomite "Celite" were introduced into a stainless steel 5 liter autoclave, in a nitrogen atmosphere, and stirred for 2 hours at room temperature. The mass was cooled to 8°–10° C., and 342 g of aluminum triethylsesquichloride (reducing agent) were added, maintaining the temperature at 8°–10° C. for 120 minutes.

The resulting supported complex $(TiCl_3)_3.AlCl_3$ was preactivated by heating to 120° C. for 30 minutes. The n-heptane was removed by decantation, and the complex was diluted with 1,250 cc of dearomatized n-heptane.

240 g of n-butyl ether (complexing agent) were added, and the whole was heated to 120° C. for 30 minutes in order to complete the activation of the catalyst. The product obtained was filtered, washed with n-heptane and dried. It exhibited the following characteristics:

Composition revealed on analysis: $TiCl_3.(AlCl_3)_{0.12}$(n-butyl ether)$_{0.11}.$(diatomite)$_{125\ g}$ surface area (m$^2$/g): 11.5 porosity (cc/g): 0.052. The X-ray diffraction spectrum, obtained by means of a Debye camera having a 114.6 mm diameter, using the Ni-filtered radiation $C_4K\alpha$, with a 36 kV voltage and an 18 mA current, with an exposure of 15 hours, revealed the presence of crystalline $SiO_2$ and of the crystalline delta form of $TiCl_3$.

Polymerization Test 50 liters of dearomatized n-heptane,
30 grams of the component of Example 13, and
860 grams of aluminum diethyl monochloride in a 10% heptane solution were introduced into a stainless steel 200 liter autoclave.

The mass was heated to 70° C. and 50 liters of propylene were introduced in 3 hours. The unreacted propylene was then vented to the atmosphere, after which the mass was cooled and the catalytic complex was decomposed by adding 2 liters of n-butyl alcohol. The whole was heated to 100° C. for 1 hour, cooled, and the slurry was transferred to a 400 liter reactor. 50 l of water and 2 g of surfactant were added; finally it was distilled in a vapor stream in order to remove the solvent. The resulting suspension was centrifuged and dried at 60° C.

20.4 kg of a polymer having the following characteristics were obtained:

residue of the extraction with heptane: 93.5%
apparent density: 0.39 g/cc.

In this comparative Example, a diatomite amount exceeding applicants' limit was used. As appears from this Example, the polymerization yield is decidedly lower than the yield of Examples 5 to 11, in which ether-activated catalysts were utilized too. Compared with those Examples, also, the residue of the extraction with heptane is lower, as is the apparent density.

The olefins which can be polymerized to highly isotactic polymers by the final catalysts prepared from the new catalyst-forming components of the invention are alpha-olefins of the formula $CH_2=CHR$ in which R is an alkyl radical containing from 1 to 6 carbon atoms. Mixtures of said alpha-olefins with ethylene can also be polymerized to obtain copolymers in which the polymerized alpha-olefin units have isotactic structure.

What is claimed is:

1. Process for preparing a solid catalyst-forming component based on titanium trichloride, useful in the stereo-specific polymerization of olefins, characterized in that the catalyst component is obtained by:
   (a) dispersing a siliceous material of the diatomite type having a silica content higher than 50% by weight in a mixture of an inert hydrocarbon solvent and $TiCl_4$, in an amount of from 2 to 100 g/gram mole of $TiCl_4$;
   (b) reducing $TiCl_4$, in the presence of said siliceous material, to $TiCl_3$ by means of aluminum-organic compounds, at temperatures ranging from $-20°$ C. to $+20°$ C.; and
   (c) washing with the hydrocarbon solvent, filtering, and drying the solid catalyst-forming component so obtained.

2. The process of claim 1, in which the resulting catalyst-forming component is subjected to a heat treatment at temperatures ranging from 40° C. to 150° C.

3. The process of claim 1, in which the catalyst-forming component obtained is subjected to a heat treatment at temperatures ranging from 40° C. to 150° C., in the presence of a complexing agent consisting of an aliphatic or aromatic ether, and then to a washing with hydrocarbon solvents in order to remove a substantial portion of the $AlCl_3$ bound to the catalyst-forming component.

4. The process of claim 3, in which the ether is used in mixture with hydrocarbon solvent.

5. The process of claim 3, in which the complexing agents are aliphatic or aromatic ethers of the formula R—O—R', wherein R and R', like or unlike each other, are methyl, ethyl, n-propyl, n-butyl, sec.-butyl, tert.-butyl, n-amyl or isoamyl, and are used in an amount of 20–200 g/100 g of catalyst-forming component treated.

6. A solid catalyst-forming component for stereospecifically polymerizing olefins, said component being characterized in having a surface area comprised between 20 and 100 m$^2$/g, a porosity higher than 0.05 cc/g, a molar composition $TiCl_3.1/3AlCl_3$ and supported on a siliceous material of the diatomite type in an amount equal to 2–100 g/mole of $TiCl_3$, said siliceous material having a silica content higher than 50% by weight.

7. A solid catalyst-forming component for stereospecifically polymerizing olefins, and being characterized in having the following molar composition: $TiCl_3.(AlCl_3)_{0.05-0.2}.$(ether)$_{0.01-0.3}$, in being supported on a siliceous material of the diatomite type having a silica content higher than 50% by weight and used in an amount of from 2 to 100 g/mole of $TiCl_3$, in having a surface area comprised between 50 and 150 m$^2$/g, and a porosity higher than $>0.10$ cc/g, and the X-rays spectrum of which shows a crystalline "delta" structure and a diffraction line at 4.13 A, typical of the diatomite support.

8. Catalyst for polymerizing olefins, obtained by mixing an organometallic aluminum compound with the solid catalyst component of claim 6.

9. The catalyst of claim 8, in which the organometallic aluminum compound is utilized in the form of a complex with electron-donor compounds.

10. Catalyst for polymerizing olefins, obtained by mixing an organometallic aluminum compound with the solid catalyst component of claim 8.

11. The catalyst of claim 10, in which the organometallic compound is utilized in the form of a complex with electron-donor compounds.

* * * * *